United States Patent [19]
Whelan

[11] Patent Number: 5,261,067
[45] Date of Patent: Nov. 9, 1993

[54] METHOD AND APPARATUS FOR PROVIDING SYNCHRONIZED DATA CACHE OPERATION FOR PROCESSORS IN A PARALLEL PROCESSING SYSTEM

[75] Inventor: Michael P. Whelan, Cresskill, N.J.

[73] Assignee: North American Philips Corp., New York, N.Y.

[21] Appl. No.: 510,336

[22] Filed: Apr. 17, 1990

[51] Int. Cl.⁵ .................... G06F 15/16; G06F 12/08
[52] U.S. Cl. .................... 395/425; 395/200; 395/650; 364/DIG. 1; 364/228.1; 364/228.3; 364/229.2; 364/243.4; 364/243.44; 364/270.7; 364/280.4
[58] Field of Search ............. 364/DIG. 1, DIG. 2; 395/425, 200, 650

[56] References Cited

U.S. PATENT DOCUMENTS

| | | | |
|---|---|---|---|
| 3,848,234 | 11/1974 | MacDonald | 395/425 |
| 4,775,955 | 10/1988 | Liu | 395/425 |
| 4,783,736 | 11/1988 | Ziegler et al. | 395/425 |
| 4,959,777 | 9/1990 | Holman, Jr. | 395/325 |
| 5,025,366 | 6/1991 | Baror | 395/425 |

OTHER PUBLICATIONS

Bernstein, P. A., *Sequoia: A Fault Tolerant Tightly-Coupled Computer for Transaction Processing*, pp. 1-43 (May 2, 1985).

Primary Examiner—Thomas C. Lee
Assistant Examiner—Matthew C. Fagan
Attorney, Agent, or Firm—David Schreiber

[57] ABSTRACT

Apparatus and method for insuring data cache content integrity among parallel processors is provided. Each processor has a data cache to store intermediate calculations. The data cache of each processor is synchronized with each other through the use of synchronization intervals. During entry of a synchronization interval, modified data variables contained in an individual cache are written back to a shared memory. The unmodified data contained in a data cache is flushed from memory. During exiting of a synchronization interval, data variables which were not modified since entry into the synchronization interval are also flushed. By retaining modified data cache values in the individual processors which computed the modified values, unnecessary access to shared memory is avoided.

6 Claims, 4 Drawing Sheets

PROCESSOR 12

```
MOV   0,R2
MOV   1,R1
LD    W,R3
```

LOOP_P1:

```
LD    B[R1],R4
LD    A[R1],R5
LD    A[R2],R6
ADD   R4,R3,R4
MUL   R4,R5,R4
ADD   R4,R6,R4
ST    R4,A[R1]
MOV   R1,R2
ADD   R1,1,R1
CMP   R1,32
BLT   LOOP_P1
```

FIG. 3A

PROCESSOR 14

```
MOV   0,R2
MOV   1,R1
LD    Z,R3
```

LOOP_P2:

```
LD    B[R1],R5
LD    B[R2],R6

ADD   R3,R5,R5
MUL   R6,R5,R5
ST    R5,B[R1]
MOV   R1,R2
ADD   R1,1,R1
CMP   R1,32
BLT   LOOP_P2
```

FIG. 3B

METHOD AND APPARATUS FOR PROVIDING SYNCHRONIZED DATA CACHE OPERATION FOR PROCESSORS IN A PARALLEL PROCESSING SYSTEM

The present invention relates to parallel processing apparatus for executing different segments of a computer program simultaneously. Specifically, a method for providing a data cache for locally storing shared variables computed by the processing system is described.

Parallel processing techniques have improved the ultimate speed for executing a computer program. The program is compiled into individual execution sequences for each of a plurality of computer processors. Variables calculated by one processor are necessarily shared with the other processors to execute the different segments of the computer program.

In one scheme for effecting parallel processing, synchronization between processors is accomplished using barriers and channels. In a barrier synchronized system, the program contains the identity of certain portions of a program beyond which an individual processor may not execute until assurances are obtained that other processors have used previously computed variables by a processor which reaches a barrier. During execution of the program, a processor will determine from a register, common to all processors, whether or not the barrier bit has been set. When all processors have set a respective barrier bit in the register, the processors may continue beyond the barrier. Similarly, a channel may be used to identify to other processors when a given processor has reached a certain stage of execution. Writing to a common channel register permits other processors to inspect the register and determine when another of the parallel processors has reached the predefined point of execution.

The shared variables which are computed by individual processors are stored in a shared memory connected to each processor through a shared memory bus. In this way, it is possible for other processors to have access to a computed variable for execution of other segments of the parallel program. By employing the barrier and channel structures, synchronization is realized between processors such that one processor may not change the value of a variable until another processor has read the variable, thereby synchronizing the various processors' execution.

During execution of a program segment by a processor, that processor may use a computed variable several times within the computation of the segment or a subsequent segment of the program. Thus, it is advantageous to provide data caching at each processor in order that reference to the shared memory will not be required every time a shared variable computation is needed by the same processor which produced that shared variable computation.

In providing such local data caching, care must still be given to making sure that processors are synchronized and that data caches are periodically flushed to avoid retaining an old value for a shared variable, in light of a newly written variable value in the shared memory. Further, it is necessary to make certain that the computed shared value stored in the cache is written to the shared memory to be certain that all processors will operate from a common updated shared variable value. When these conditions are observed, the data caching will result in fewer accesses to the shared memory being necessary, thus providing for an increase in computer processing efficiency.

SUMMARY OF THE INVENTION

It is an object of this invention to provide a local data cache for each processor of a parallel processing system.

It is a more specific object of this invention to provide a local data cache for each processor which reduces the necessity to access a shared variable memory.

These and other objects of the invention are provided by a data cache located at each processor. As shared variable calculations are determined in each of the processors, the values are stored in a local data cache. Upon entering a synchronization interval for the processors for the first time, any data cache values which were read from the shared memory, and not changed, are stored in the data cache. Upon leaving the first synchronization interval, the data cache will update each newly computed shared data value and delete any unmodified data values from the cache. Upon entering a subsequent synchronization interval, modified shared data values are written to the shared memory, representing the most current values of the shared data which other processors read and utilize. Upon exiting the subsequent synchronization interval, data values which were unmodified since entering the subsequent synchronization interval are deleted from the local data cache, thus avoiding data cache pollution while modified variables are retained in the cache. Modified shared data values are therefore available to the local processor without the necessity for accessing the shared variable memory. Thus, the most currently calculated values for variables are retained by the processor performing the calculation. This results in an advantageous reduction in the required access to the shared memory.

BRIEF DESCRIPTION OF THE FIGURES

FIGS. 3A and 3B illustrate the programming steps for each of processors 1 and 2 to provide execution of a program code using shared variables.

DESCRIPTION OF THE PREFERRED EMBODIMENT

Figure 1:
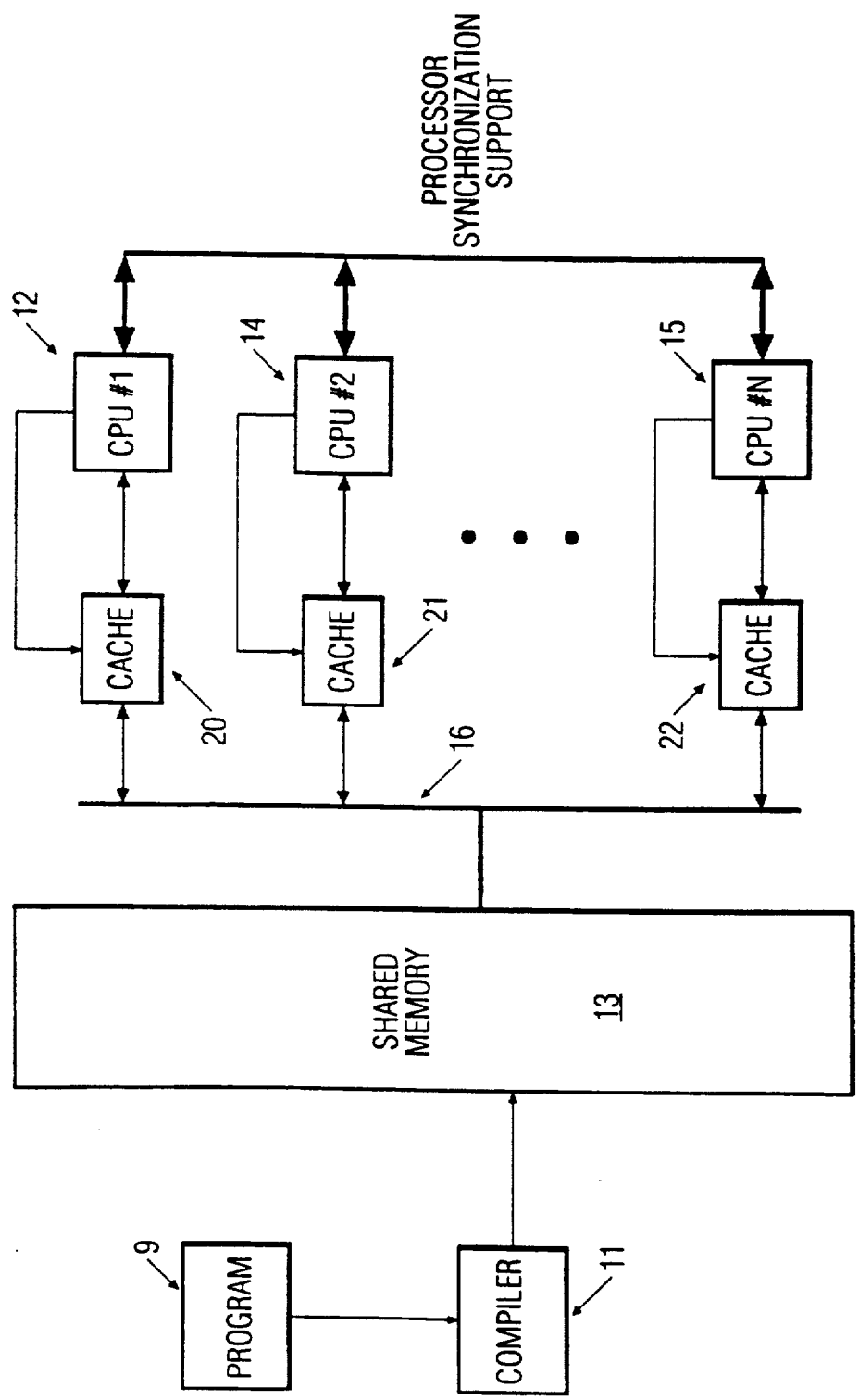
FIG. 1 is a block diagram illustrating a multiprocessor parallel processing computer.

FIG. 1 illustrates a rudimentary parallel processing scheme, wherein three processors, 12, 14 15, are shown to execute a program 9. A compiler 11 provides segments of a compiled program to each of the processors 12, 14 and 15 for execution.

The processors 12, 14 and 15 are synchronized via barrier instructions compiled within the program. The barrier instructions will be used to halt execution of a processor when synchronization is needed between each of the processors 12, 14 and 15. The barriers require that certain values calculated for a given variable be available to be read by other processors which may need the variable for execution of their related program segment. The barriers may be fuzzy barriers which permit the processor to execute a number of restricted instructions which do not require synchronization with other processors.

Associated with each of the processors 12, 14 and 15 is a data cache 20, 21 and 22, capable of holding the values of shared variables computed by a respective processor. As in other parallel processing schemes, a shared memory 13 is provided which is written at appropriate intervals of execution of each of the processors 12, 14 and 15 with new values for a shared value. Also illustrated in the Figure associated with processors 12 and 14 are registers for storing fixed data values such as I, W and Z, which do not change for a given execution.

Figure 2:
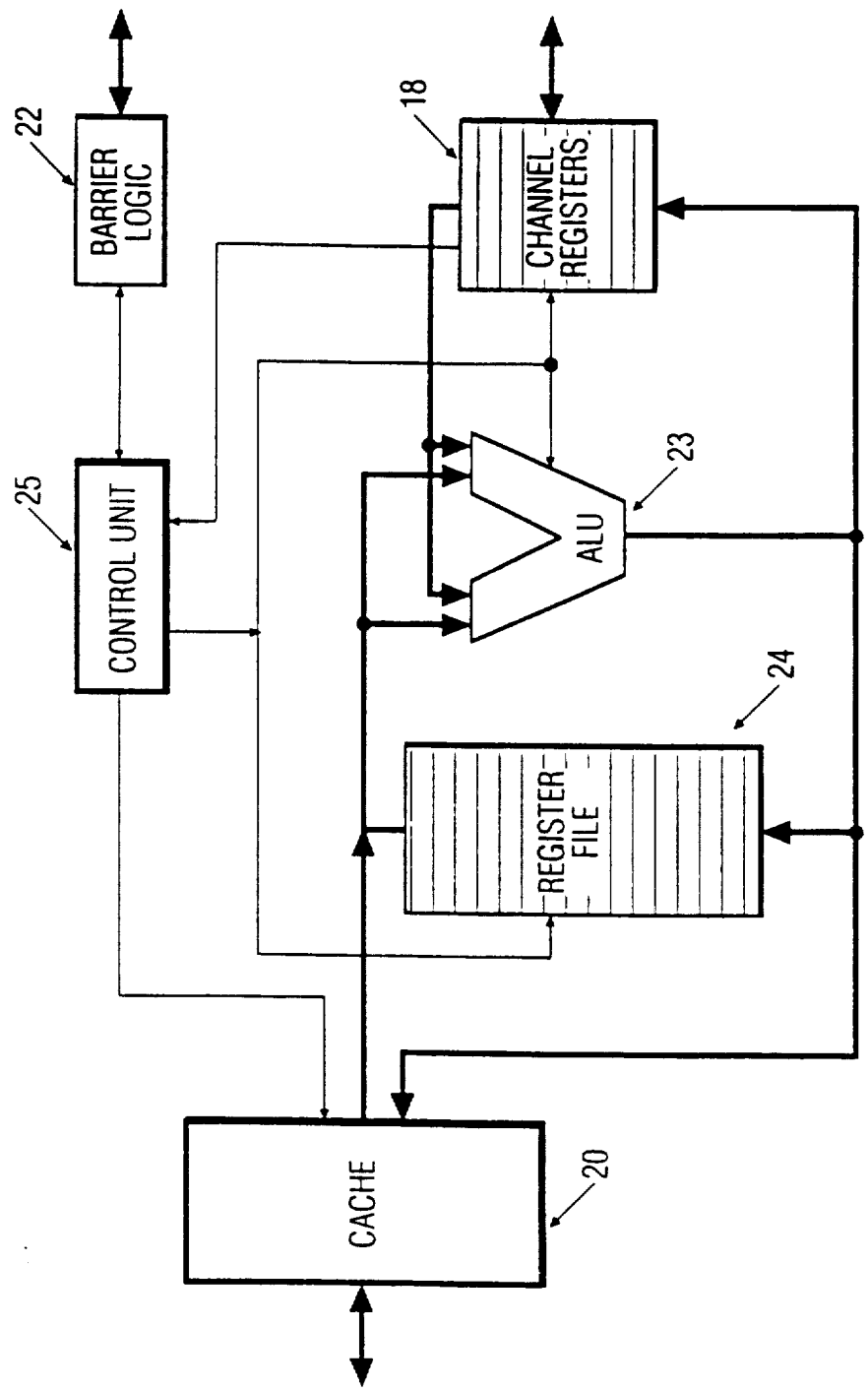
FIG. 2 is an illustration of the architecture of a processor for the multiprocessing system of FIG. 1.

FIG. 2 illustrates in greater detail the organization of each of the processors 12, 14 and 15, including a channel register 18 and a barrier flag register of barrier logic circuit 22. The barrier flag register is associated with each of the processors and includes a dedicated bit position corresponding to each of the processors 12, 14 and 15. When a processor has reached a barrier, as determined from internal programming statements, a valid flag is inserted in its respective dedicated bit position for each flag register of the barrier logic circuit 22 of each of the processors 12, 14 and 15. A channel register 18 is shown which provides an indication of the status of execution for a given processor, and adjacent processors. Thus, by making inquiry to the channel register, it is possible to ascertain whether or not certain computations by adjacent processors have been completed. In parallel processing systems using barrier synchronization, the channel register 18 offers another indication of the position a parallel processor is in its execution sequence. Normally, when another processor has executed a certain statement in its program segment, a flag is posted in the channel register 18, identifying the fact that the processor has proceeded through the statement producing the flag. Thus, the channel register may be another means for identifying synchronization intervals for the respective processors. The control unit 25 provides the requisite signalling and data transfer among devices of FIG. 2.

The effects of executing code with parallel processors, and the advantages derived from using a data cache at each of the processors may be illustrated through a simple example. If the following piece of code is to be executed in two parallel processors. FIGS. 3A and 3B will illustrate the general processor execution sequence integer A[32], B[32], W, Z;

for(I = 1;I<32;I = I+1)

{

A[I] = A[I]*(B[I]+W)+A[I-1]

B[I] = (B[I]+Z)+B[I-1]

}

Processor 12 will be used to calculate new values for the vector A, and processor 14 will calculate new values for the vector B. Since the new value of B[I] requires the use of the older B vector calculations, it is necessary to synchronize the processors in order that the earlier B vector calculations are available to processor 12 before they are rewritten with newer calculated B values by processor 14.

Variables W and Z are invariant within the loop and thus the register file 24 of each of the processors 12 and 14 may be preloaded with these values. The index value of I is independently computed in each processor. Register file 24 will maintain the current and previous values of the index variable I. Initially, the index values are set to 1 and 0, and at the end of each iteration, the value of I is copied to register 24. It is then incremented by 1.

The pseudo code convention used to implement the foregoing loops for calculating A and B may be summarized as follows:

| | |
|---|---|
| MOV Ra, Rb | Copy the contents of Ra into Rb |
| Ld X, Rd | Load memory specified by X into register Rd |
| ADD Ra,B,Rd | Put the sum of Ra and B (either a register or a constant) into Rd |
| MUL Ra,C,Rd | As in ADD but use the product instead of the sum |
| ST Rs,X | Store contents of register Rs into memory location specified by X |
| CMP X,Y | Set condition codes based on comparing X and Y |
| BLT LAB | Branch to LAB if the conditions indicate a "less than" result. |

FIGS. 3A and 3B illustrate the pseudo codes comprising the program segment for each of processors 12 and 14. Also illustrated in FIGS. 3A and 3B are the effects of a barrier provided in the software for each of processors 12 and 14. As is clear from the basic lines of code which are to be calculated, the value of B[R1] is loaded in register 4 by processor 14 and used in the calculation of A[R1] by processor 12. Processor 14 will store a new value of B[R1] at a portion of the program shown as instruction ST. The barrier, shown by the highlighted portions for the code in processors 12 and 14 will prevent the storage of a new value in R5 for B[R1] until the processor 12 has loaded B[R1] in its first pass through the loop. The processor 14 may be halted if processor 12 has not entered the barrier, the beginning instruction of which is LD A[R1],R5. During this time, using fuzzy barrier synchronization, the processor may execute other tasks which need not be synchronized to the execution of processor 12. Once processor 12 has progressed to the barrier, a flag will be set in barrier registers of the barrier logic 22 of each of the processors, identifying that processor 12 has reached this barrier. Processor 14, if having reached the instruction ST R5,B[R1], will have placed a flag in the barrier register of barrier logic 22 as well, indicating that it has reached the barrier. Execution will resume through the barriers when the flags in the barrier register of barrier logic 22 have all been set to 1 indicating each processor is now free to change the value which the other processors may have needed for executing their segment of the program.

Figure 4:
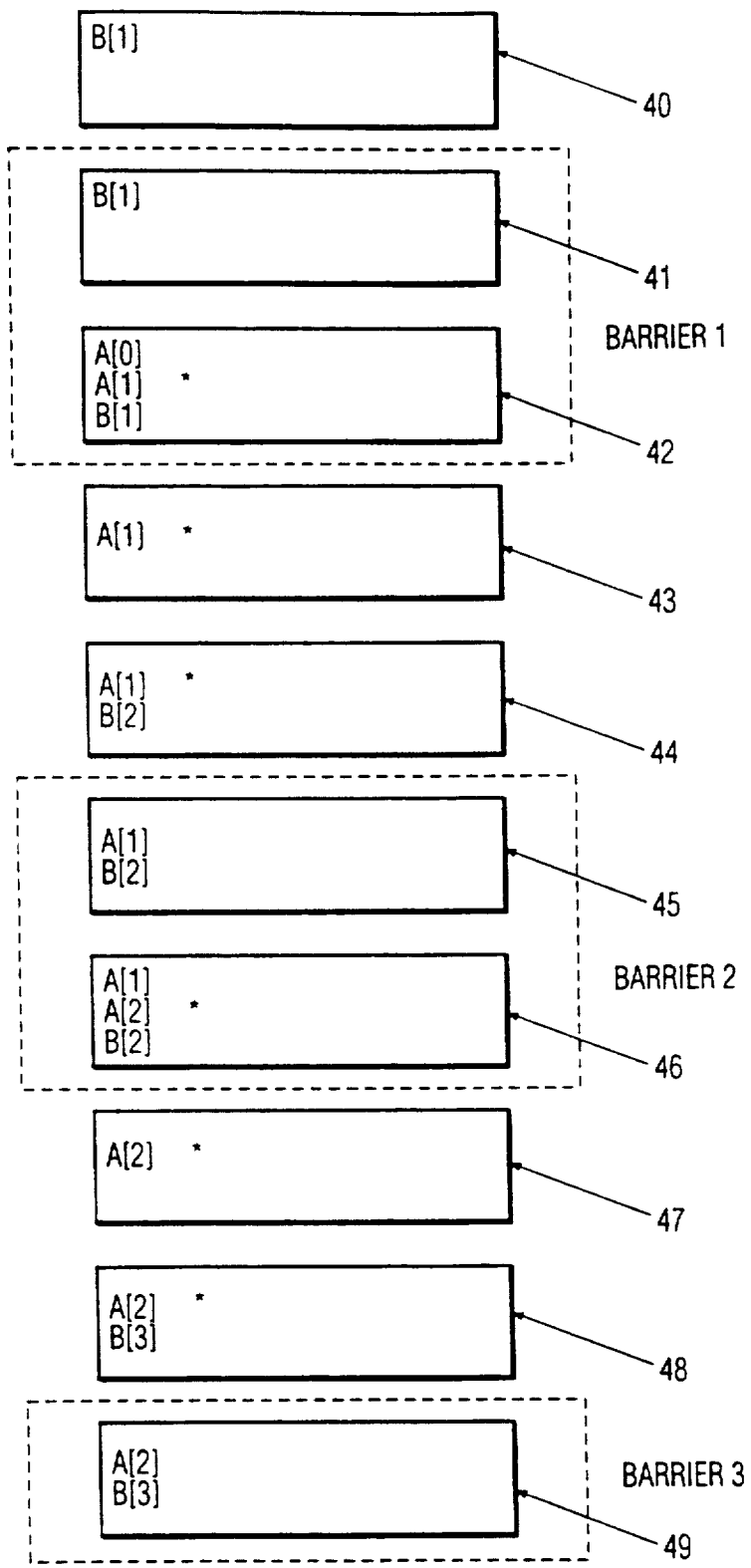
FIG. 4 illustrates the operation of the data cache of processor 1 in executing the code of FIG. 3.

In executing the code as shown in FIGS. 3A and 3B, using two parallel processors 12 and 14, the operation of the data cache may be explained with reference to FIG. 4, where three barriers are shown and control over the data cache as processor 1 executes its segment of the program.

Prior to entering the first barrier, processor 12 would have data contained in register R4 which is the value of B[1], and in R3, the value for W. Upon entering the barrier, the value of B[1] will be a read value from the memory, which was not modified. The index value I is read from register R1.

Since no values were modified by the processor, no further action needs to be taken until after the barrier is entered. Once having entered the barrier, the previous value of B[1] remains in 41. The processor will compute values for A[1] and retain the initial value of B[1]. The stored instruction ST, shown in FIG. 3A for processor 12, will result in a modified copy of A[1] being provided. This modified value of A[1] is identified with *. Before the processor 12 can exit the barrier region, any entries in its cache which have not been modified should be invalidated. Modified entries can be left as valid. Thus, just after exiting the barrier, the values for A[0] and B[1] are invalidated and flushed from the data cache 20, while the cache entry associated with A[1] is left unchanged. The invalidated and deleted data will therefore not be misread if another processor has since updated that shared value and written a new value into the shared memory location.

Once the barrier region has been exited, the retained value of A[1] is supplemented by a newly read value B[2] from the shared memory in data cache 20. Before entering a barrier region 2, data in the cache which has been modified since being read, i.e., A[1]*, must be written back into the shared memory to permit other processors access to the newly calculated value. At this time, the value is retained in cache, and an indication that it has been written back to memory is provided in cache. (This indication is represented by the absence of *.) The value of B[2] having been read from the shared memory is also retained after entering the barrier region.

Once entering the barrier region in 45, the values of A[1] and B[2] are retained during the fuzzy barrier period. During the fuzzy barrier period, a new value for A[2] is calculated in 46. Upon exiting the second barrier, the unmodified data including A[1] and B[2] are deleted from the cache memory, retaining only the previously modified value of A[2].

The programming execution continues in 48 with a new value B[3] being calculated. Using the foregoing rules, entry into the third barrier commences only after writing the new modified A[2] back to the shared memory, and providing an indication in the data cache 20 that it has been written back to the shared memory in 49 by deleting *.

Thus, it can be seen that by retaining modified values of shared data values in the processor which computed the modified value, unnecessary references to the shared memory are avoided. Additionally, the use of the barrier synchronization to delete unmodified values of a shared variable avoids the consequence of retaining and using an old data value which may have been updated and written to shared memory locations by another processor.

Although barrier synchronization provides a convenient opportunity to control cache flushing and writing to shared memory, other synchronization may be implemented. For instance, reading and writing to channels provides a convenient measure of the relative position of each processor in parallel execution, and therefore permits control of the cache to flush unneeded data values and write to the shared memory.

Thus, there is described with respect to one embodiment a technique for implementing local data cache operations for processors in a parallel processing system. Those skilled in the art will recognize yet other embodiments of the invention described more particularly by the claims which follow.

What is claimed is:

1. A method for insuring data cache content integrity among a plurality of parallel processors, wherein each processor includes a data cache for storing shared data used by said processors and wherein said processors synchronize execution of instructions by executing a synchronization region in said instructions, the method comprising the steps of:
   storing shared data in the data cache of one of said processors;
   upon entering said synchronization region, writing shared data which was modified by said one processor prior to execution of said synchronization region from the data cache of said one processor to a shared memory for use by another one of said processors and retaining in the data cache of said one processor shared data which was not modified by said one processor while in the data cache of said one processor; and
   during exiting of said synchronization region, deleting from the data cache of said one processor shared data which was not modified by said one processor during execution of said synchronization region.

2. The method of claim 1, further including the step of:
   during exiting of said synchronization region, retaining in the data cache of said one processor shared data which was modified by said one processor during execution of said synchronization region.

3. In a parallel processing system wherein a first processor and a second processor cooperatively execute portions of a single program, said first and second processors sharing data during execution of said program and synchronizing execution by executing a synchronization region in said program, a method for reducing access by said first processor to a shared memory which stores said shared data, the method comprising the steps of:
   loading said shared data from said shared memory into a data cache coupled to said first processor;
   classifying said shared data in said data cache as valid unmodified data if said shared data was not modified by said first processor while in said data cache and as valid modified data if said shared data was modified by said first processor prior to being written to said shared memory for use by said second processor;
   prior to entering said synchronization region, writing said valid modified data to said shared memory for use by said second processor and reclassifying said valid modified data in said data cache as valid unmodified data;
   loading said valid unmodified data into said first processor to generate valid modified data; and
   upon leaving said synchronization region, deleting said valid unmodified data from said data cache and retaining said valid modified data in said data cache.

4. In a parallel processing system wherein a plurality of processors operate in parallel to execute portions of a computer program, said processors synchronizing execution of said program by executing synchronization regions in said program, said processors accessing shared data stored in a shared memory, each of said processors coupled to a respective one of a plurality of data caches for storing said shared data loaded from said shared memory, a method for reducing access to said shared memory by said plurality of processors, the method comprising the steps of:
   storing shared data in the data cache of one of said processors;

upon entering a first one of said synchronization regions, retaining in the data cache of said one processor shared data read from said shared memory prior to modification by said one processor;

upon leaving said first synchronization region, updating the data cache of said one processor to include shared data which was processed by another one of said processors;

upon entering a second one of said synchronization regions, writing shared data which was modified by said one processor from the data cache of said one processor to said shared memory for use by another one of said processors; and upon leaving said second synchronization region, deleting from the data cache of said one processor shared data which was not modified by said one processor during execution of said second synchronization region and retaining in the data cache of said one processor shared data which was modified by said one processor during execution of said second synchronization region.

5. The method of claim 4, further including the step of loading said shared modified data from the data cache of said one processor to said one processor data for processing.

6. An apparatus in a parallel processing system for reducing access to data in a shared memory including:

a first processor and a second processor, said first and second processors sharing data during execution of a program and synchronizing execution by executing a synchronization region in said program;

a data cache coupled to said first processor;

means for loading said shared data from said shared memory into said data cache;

means for classifying said shared data in said data cache as valid unmodified data if said shared data was not modified by said first processor while in said data cache and as valid modified data if said shared data was modified by said first processor prior to being written to said shared memory for use by said second processor;

means for, prior to entering said synchronization region, writing said valid modified data to said shared memory for use by said second processor and reclassifying said valid modified data in said data cache as valid unmodified data;

means for loading said valid unmodified data into said first processor to generate valid modified data; and means for, upon leaving said synchronization region, deleting said valid unmodified data from said data cache and retaining said valid modified data in said data cache.

* * * * *